US012725743B2

(12) United States Patent
Peng et al.

(10) Patent No.: US 12,725,743 B2
(45) Date of Patent: Sep. 1, 2026

(54) KEY STRUCTURE

(71) Applicant: Darfon Electronics Corp., Taoyuan City (TW)

(72) Inventors: Hsun-Kun Peng, Taoyuan City (TW); Po-Wei Tsai, Taoyuan City (TW)

(73) Assignee: Darfon Electronics Corp., Taoyuan City (TW)

(*) Notice: Subject to any disclaimer, the term of this patent is extended or adjusted under 35 U.S.C. 154(b) by 295 days.

(21) Appl. No.: 18/650,252

(22) Filed: Apr. 30, 2024

(65) Prior Publication Data

US 2024/0379306 A1 Nov. 14, 2024

(30) Foreign Application Priority Data

May 11, 2023 (TW) ................................ 112117515

(51) Int. Cl.
*H01H 13/14* (2006.01)
*H01H 13/20* (2006.01)
*H01H 13/70* (2006.01)

(52) U.S. Cl.
CPC ............ *H01H 13/14* (2013.01); *H01H 13/20* (2013.01); *H01H 13/70* (2013.01)

(58) Field of Classification Search
CPC ........ H01H 13/14; H01H 13/20; H01H 13/70; H01H 2221/058; H01H 2221/062; H01H 13/10; H01H 13/7065; H01H 3/125; H01H 13/7006; H01H 13/702; H01H 13/703; H01H 13/704; H01H 13/705; H01H 3/12; H01H 13/7057
See application file for complete search history.

(56) References Cited

U.S. PATENT DOCUMENTS

| | | | | |
|---|---|---|---|---|
| 5,504,283 A | 4/1996 | Kako et al. | | |
| 10,672,570 B2 * | 6/2020 | Chen | H01H 3/122 |
| 12,469,656 B2 * | 11/2025 | Tsai | H01H 13/702 |
| 2010/0243420 A1 * | 9/2010 | Lin | H01H 3/125 200/344 |

FOREIGN PATENT DOCUMENTS

| | | |
|---|---|---|
| CN | 105428126 A | 3/2016 |
| CN | 109256293 A | 1/2019 |
| TW | 201931405 A | 8/2019 |
| TW | 202234441 A | 9/2022 |
| TW | 202234442 A | 9/2022 |

OTHER PUBLICATIONS

Office action of counterpart application by Taiwan IP Office on Dec. 25, 2024.

* cited by examiner

*Primary Examiner* — Lheiren Mae A Caroc

(57) ABSTRACT

A key structure including a keycap, a base plate, at least one bracket and a circuit board is provided. The base plate is arranged opposite to the keycap and includes at least one through hole located under the keycap. The bracket is rotatably connected between the keycap and the base plate, keeps flat when the keycap is lowered to a lowest position, stands obliquely when the keycap is raised, and includes at least one abutting portion and a lower protrusion. The circuit board is located between the keycap and the base plate and has at least one opening and at least one extension portion. When the keycap reaches the lowest position, the extension portion of the circuit board at least partly overlaps with the abutting portion of the bracket, and the lower protrusion of the bracket at least partly enters at least one opening of the circuit board.

20 Claims, 7 Drawing Sheets

KEY STRUCTURE

This application claims the benefit of Taiwan application Serial No. 112117515, filed May 11, 2023, the subject matter of which is incorporated herein by reference.

BACKGROUND OF THE INVENTION

Field of the Invention

The invention relates in general to an input device, and more particularly to a key structure.

Description of the Related Art

Keyboard is normally used as a manual input device. For the users to use the keyboard more flexibly, the keycap is supported on the base plate by a scissor structure, so that the keycap cam moves with respect to the base plate. The scissor structure of a conventional press key is fastened to a hook of the base plate. When the user presses the press key, the scissor structure will directly collide with the base plate. Under such circumstances, more noises and greater vibrations will be generated, and the silence of key pressing operation will be affected. Besides, the thin-film circuit board has a number of openings, which allow the scissor structure to be engaged with the hooks of the base plate. The position and size of the opening could affect the routing space of the thin-film circuit board. Therefore, it has become a prominent task for the industry to provide a mechanism capable of increasing the routing space and/or noise cancelation without affecting the design of the opening.

SUMMARY OF THE INVENTION

The present invention relates to a key structure capable of increasing routing space and/or enhancing noise cancelation.

According to a first aspect of the present invention, a key structure including a keycap, a base plate, at least one bracket and a circuit board is provided. The base plate is arranged opposite to the keycap and includes at least one through hole located under the keycap. The bracket is rotatably connected between the keycap and the base plate. The bracket keeps flat when the keycap is lowered to a lowest position and stands obliquely when the keycap is raised. The bracket includes at least one abutting portion and a lower protrusion. The circuit board is located between the keycap and the base plate. The circuit board has at least one opening and at least one extension portion. The extension portion extends parallel to the base plate and overlaps with at least one through hole of the base plate. When the keycap reaches the lowest position, the extension portion at least partly overlaps with the abutting portion; meanwhile, the lower protrusion at least partly enters at least one opening of the circuit board.

According to a second aspect of the present invention, a key structure including two adjacent keycaps, a base plate, at least two brackets and a circuit board is provided. The base plate is arranged opposite to two keycaps and at least includes two adjacent through holes respectively located under the two adjacent keycaps. The two brackets respectively are rotatably connected between the two keycaps and the base plate and allow the two keycaps to respectively ascend and descend in a vertical direction. The circuit board is located between the two adjacent keycaps and the base plate and has an extension portion and an opening respectively located under the two adjacent keycaps. The extension portion overlaps with one of the two through holes of the base plate; the opening overlaps with the other one of the two through holes. One of the two brackets at least partly overlaps with the extension portion of the circuit board in a vertical direction; meanwhile, the other one of the two brackets and a rim of the opening of the circuit board at least partly do not interfere with each other in a vertical direction.

According to a third aspect of the present invention, a key structure including a keycap, a base plate, at least one bracket and a circuit board is provided. The base plate is arranged opposite to the keycap and includes at least one through hole located under the keycap. The base plate further includes a via hole located outside the through hole. The bracket is rotatably connected between the keycap and the base plate, keeps flat when the keycap is lowered to a lowest position and stands obliquely when the keycap is raised. The bracket includes at least one abutting portion and a lower protrusion. The circuit board is located between the keycap and the base plate and has at least one opening and at least one extension portion. The at least one extension portion is located on one side of the opening and overlaps with at least one through hole of the base plate. The extension portion allows a peritreme of the through hole to be located between the extension portion and the via hole.

The above and other aspects of the invention will become better understood with regard to the following detailed description of the preferred but non-limiting embodiment(s). The following description is made with reference to the accompanying drawings.

DETAILED DESCRIPTION OF THE INVENTION

In an embodiment of the present invention, a key structure with noise cancellation is provided. When the keycap is pressed and lowered to a lowest position, the bracket fastened under the keycap keeps flat when the keycap is lowered to the lowest position. Since a part of the bracket extends parallel to the base plate to form an abutting portion, which at least partly overlaps with at least one extension portion of the circuit board and vertically overlaps with a through hole of the base plate, the bracket will not collide with the base plate or other elements underneath and will not generate noises in the course of movement. Besides, the other part of the bracket extends perpendicular to the base plate to form a lower protrusion, which vertically overlaps with the through hole of the base plate and partly enters the through hole of the base plate when the keycap reaches the lowest position, so that the bracket is provided with a larger descending space or can be moved to an even lower position in the course of the pressing action. Thus, in the course of movement, the bracket is less likely to collide with the base plate or other elements underneath and generate noises. In the embodiments of the present disclosure, a buffer structure, which mitigates the collision caused to the base plate by the bracket (that is, the extension portion of the circuit board), is provided, and with the insulating material and elasticity of the circuit board, noises are buffered and reduced. Meanwhile, in the embodiments of present disclosure, the routing space of the circuit board (that is, the extension portion of the circuit board) is increased, and the area utilization rate of the circuit board is increased by using the part (that is, the extension portion of the circuit board) by which the circuit board vertically overlaps with at least one through hole of the base plate as a border area or an extra space.

Figure 1A:
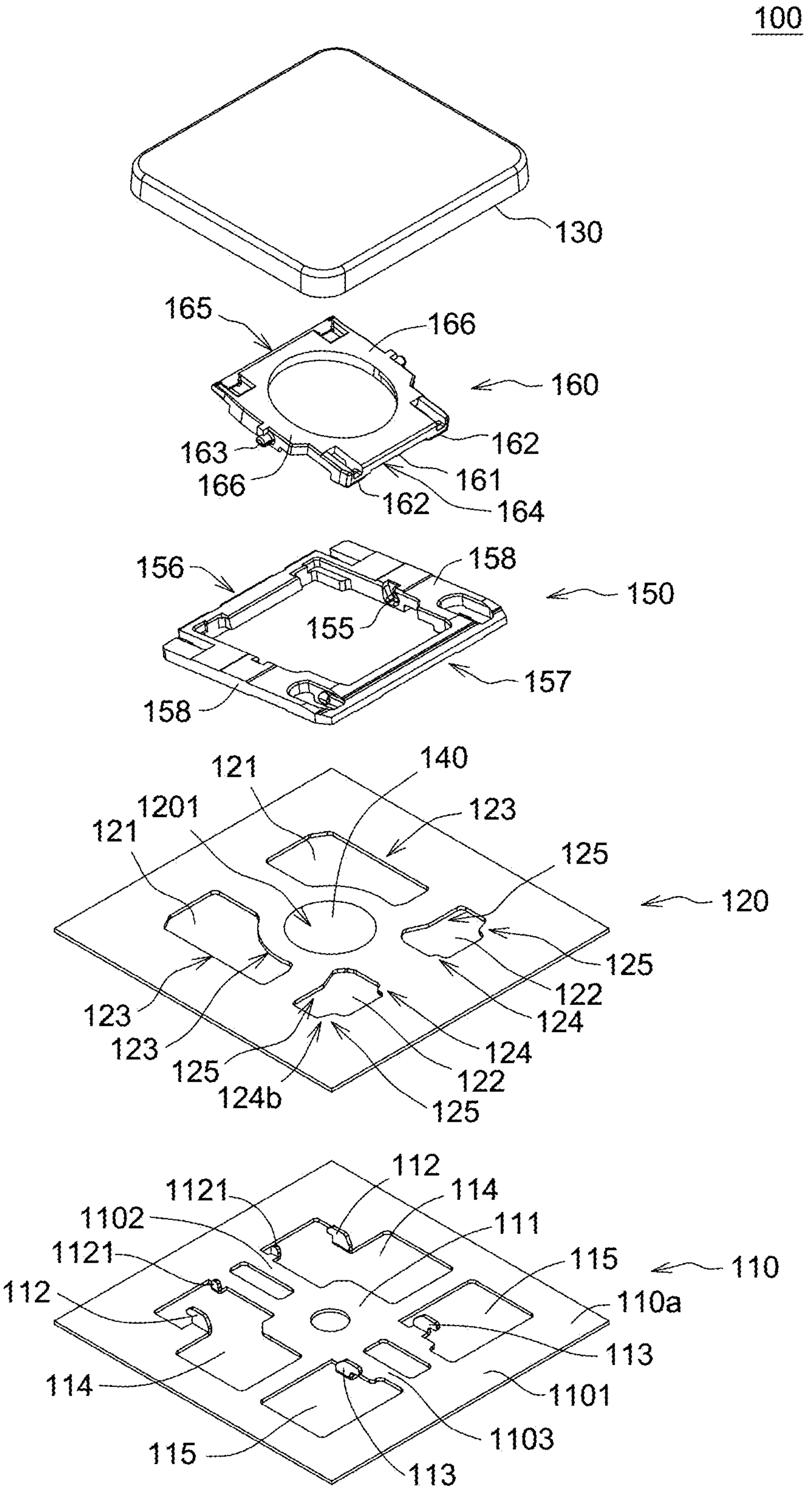
FIG. 1A is an explosion diagram of a key structure according to an embodiment of the present invention.
Figure 1B:
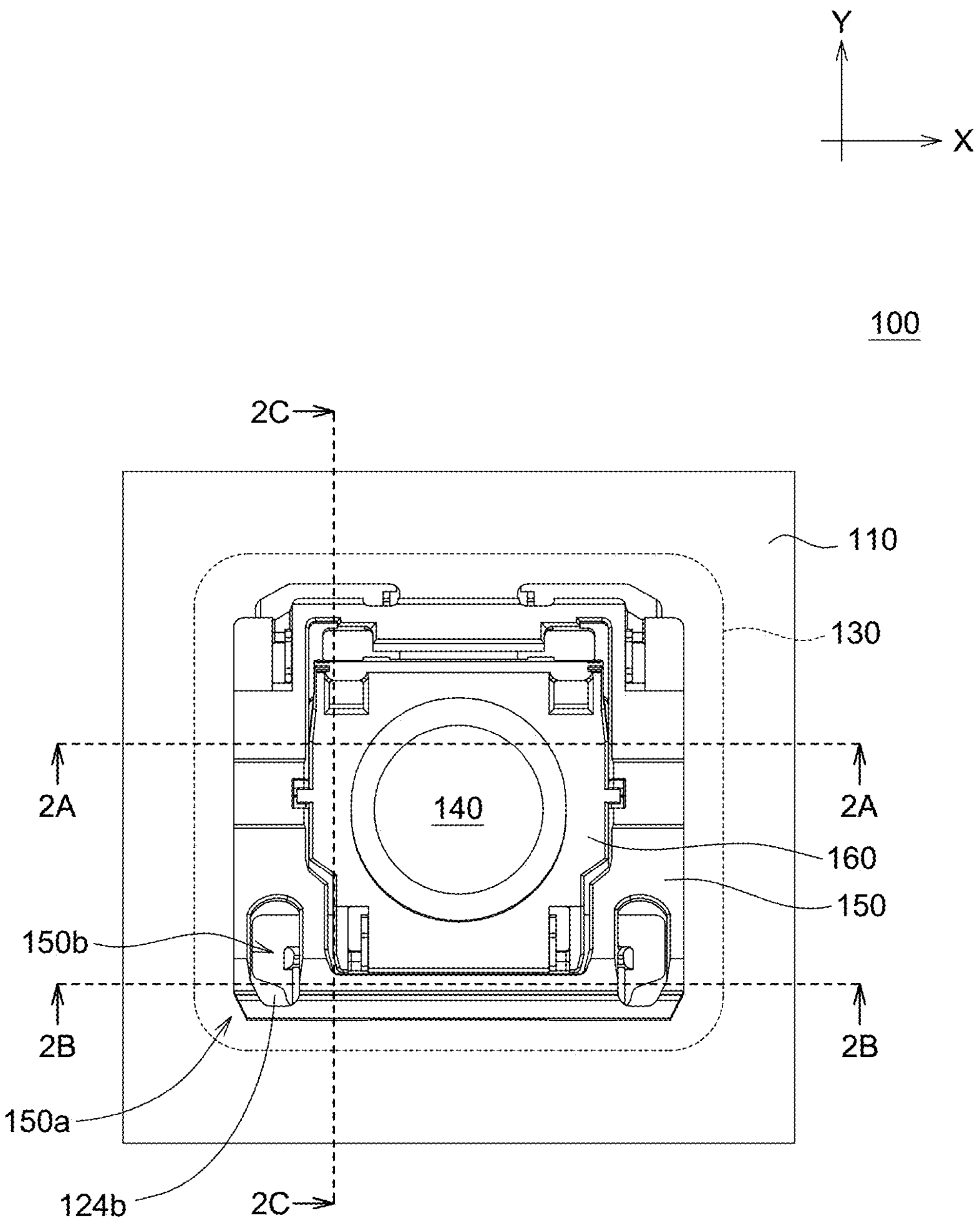
FIG. 1B is a top view of a key structure according to an embodiment of the present invention.
Figure 1C:
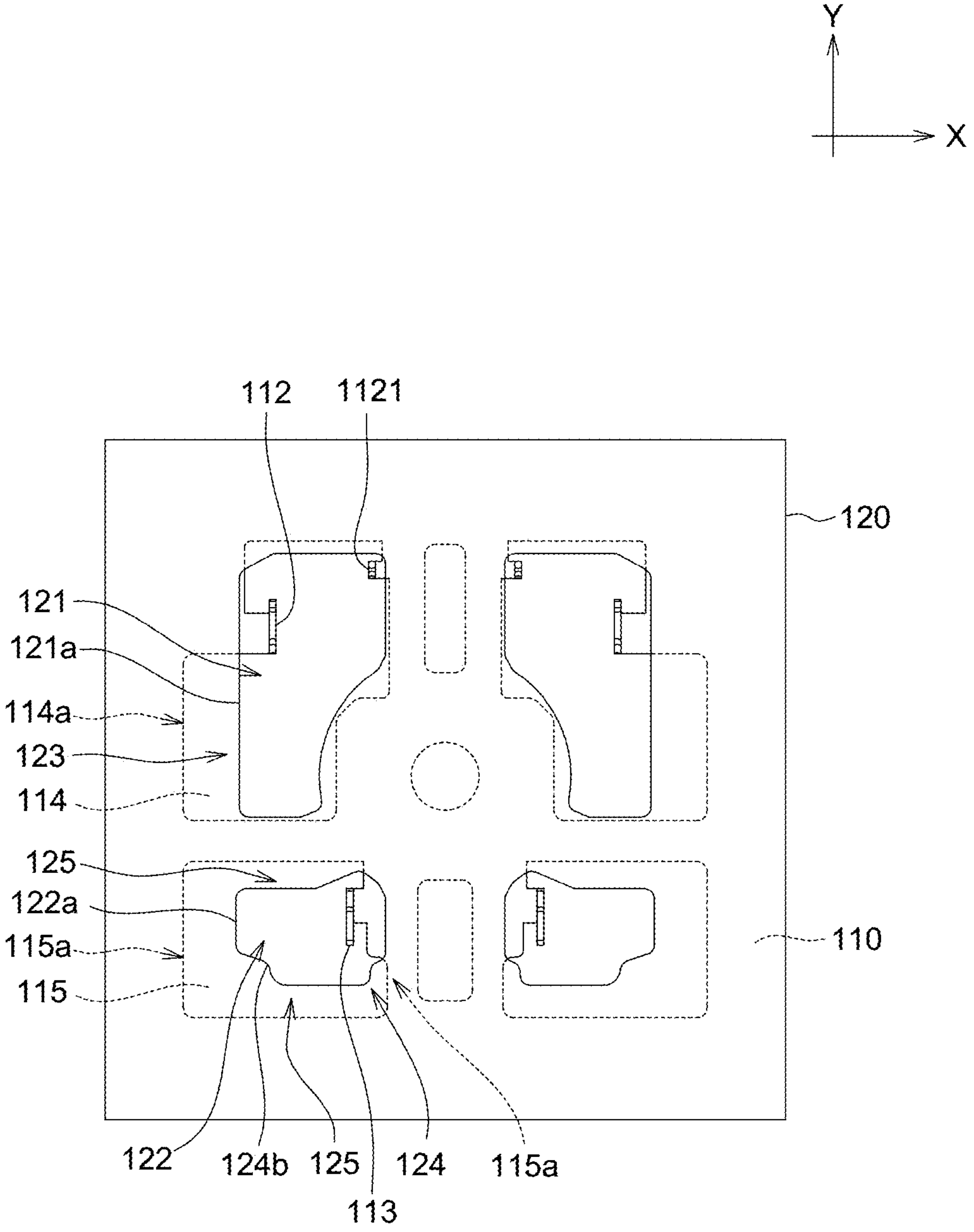
FIG. 1C is a schematic diagram of a circuit board arranged on a base plate according to an embodiment of the present invention.
Figure 2A:
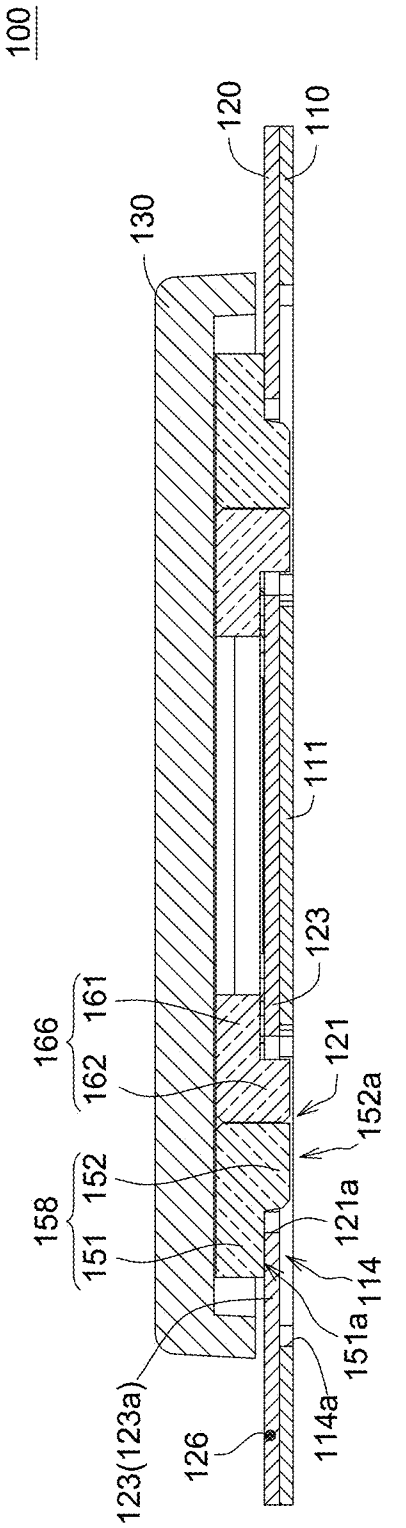
FIGS. 2A and 2B respectively are cross-sectional views of the key structure of FIG. 1B along line 2A and line 2B in a pressed state according to an embodiment.
Figure 2B:
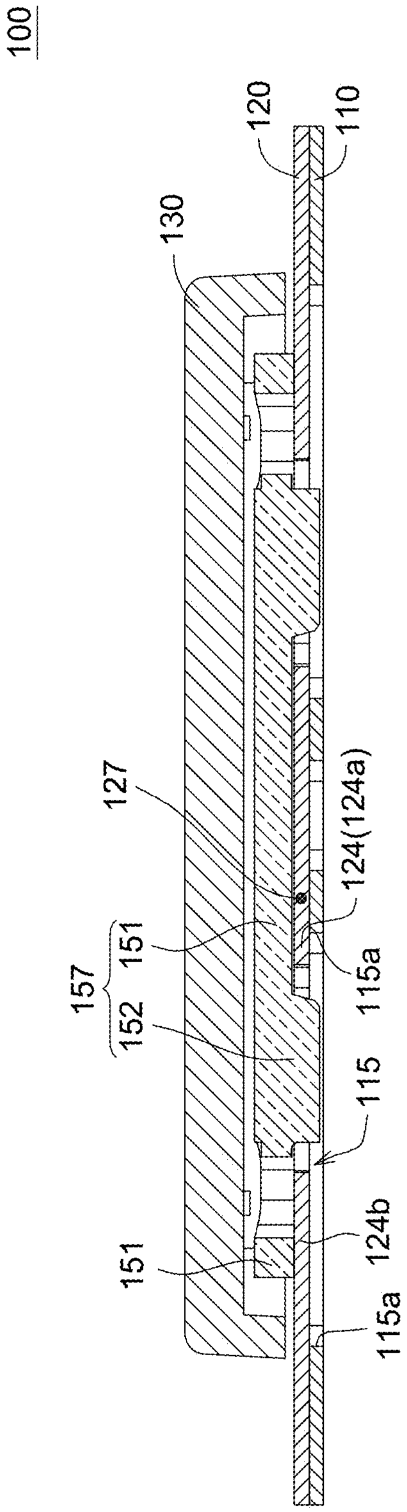
Figure 2C:
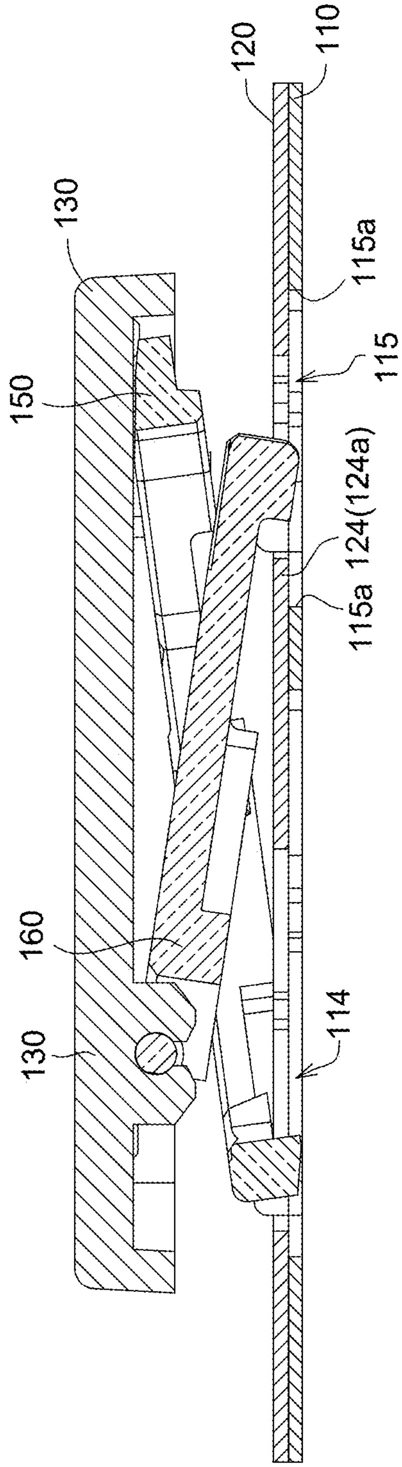
FIGS. 2C and 2D respectively are cross-sectional views of the key structure of FIG. 1B along line 2C in an unpressed state and a pressed state according to an embodiment.

Referring to FIGS. 1A to 1C, an explosion diagram and a top view of a key structure and a schematic diagram of a circuit board 120 arranged on a base plate 110 according to an embodiment of the present invention are respectively shown. The key structure 100 includes a base plate 110, a circuit board 120, a keycap 130, an elastomer 140 and at least one bracket (that is, the first bracket 150 and/or the second bracket 160). The base plate 110 is arranged opposite to the keycap 130; the circuit board 120 (such as a thin-film circuit board) is located between the keycap 130 and the base plate 110. The elastomer 140 is arranged between the circuit board 120 and the keycap 130 and allows the keycap 130 to be raised from a lower position to a higher position. The first bracket 150 and the second bracket 160 are arranged between the keycap 130 and the base plate 110. The first bracket 150 and the second bracket 160 are connected by a shaft to form a scissor structure. The first bracket 150 and the second bracket 160 are rotatably connected between the keycap 130 and the base plate 110. The first bracket 150 and the second bracket 160 keep flat when the keycap 130 is lowered to a lowest position (as indicated in FIGS. 2A and 2B) and stand obliquely when the keycap 130 is raised (as indicated in FIG. 2C).

The base plate 110 includes a rib frame 1101, a number of ribs 1102 and 1103, a middle supporting portion 111, at least one the hook (that is, the first the hook 112 and/or the second the hook 113) and at least one through hole (that is, the first through hole 114 and/or the second through hole 115). One end of the ribs 1102 and 1103 is connected to the middle supporting portion 111; the other end is connected to the outside of the rib frame 1101 and used to support the middle supporting portion 111 to be located in the rib frame 1101 and define the position and size of the through hole.

The first through hole 114 and the second through hole 115 are located in the hollowed region between the middle supporting portion 111 and the rib frame 1101. The first the hook 112 extends to the first through hole 114 from the rib frame 1101 and is perpendicular to the base plate 110 and faces upwards. The base plate 110 can further have an auxiliary positioning member 1121 arranged opposite to the first the hook 112. The auxiliary positioning member 1121 extends inwards to the first through hole 114 from the middle rib 1101 and is perpendicular to the base plate 110 and faces upwards, so that one end of the first bracket 150 (the base plate end 156) is slidably positioned between the first the hook 112 and the auxiliary positioning member 1121. Additionally, the second the hook 113 extends inwards to the second through hole 115 from the middle rib 1103 and is perpendicular to the base plate 110 and faces upwards, so that one end of the second bracket 160 (the base plate end 164) is slidably positioned in the second the hook 113. The first through hole 114 and the second through hole 115 are mainly used to provide space allowing the keycap 130 to move downwards, and at the same time avoid the downward protrusion of the keycap 130 and/or the first bracket 150 and the second bracket 160 colliding the base plate 110 or other elements and generating noises when the keycap 130 moves downwards.

The circuit board 120 is arranged on the base plate 110 and includes a triggering portion 1201, at least one opening (that is, the first opening 121 and/or the second opening 122) and at least one extension portion (that is, the first extension portion 123, the second extension portion 124 and/or the third extension portion 125).

As indicated in FIG. 1C, the first extension portion 123 is located on the rim 121*a* of the first opening 121, extends parallel to the base plate 110 and overlaps with the first through hole 114 of the base plate 110. This shows that the first extension portion 123 is located between the first the hook 112 and the peritreme 114*a* of the first through hole 114. Also, the second extension portion 124 is located on the rim 122*a* of the second opening 122, extends parallel to the base plate 110 and overlaps with the second through hole 115 of the base plate 110. This shows that the second extension portion 124 is located between the second the hook 113 and the peritreme 115*a* of the second through hole 115. Besides, the third extension portion 125 is located on the rim 122*a* of the second opening 122, extends parallel to the base plate 110 and overlaps with the second through hole 115 of the base plate 110. This shows that the third extension portion 125 is located between the second the hook 113 and the peritreme 115*a* of the second through hole 115.

Refer to FIG. 1A. The middle supporting portion 111 is opposite to the triggering portion 1201 of the circuit board 120. That is, the triggering portion 1201 of the circuit board 120 is located on the middle supporting portion 111 of the base plate 110, and the elastomer 140 is arranged on the triggering portion 1201 of the circuit board 120. The triggering portion 1201 can be realized by two electrical contacts separated by a predetermined distance. When the keycap 130 is positioned at a higher position, the two electrical contacts are separated by a larger distance and are not conducted. When the keycap 130 is pressed and lowered to a lower position, the two electrical contacts are close to each other and are conducted to trigger an electrical signal corresponding to a triggering position. The electrical signal can be transferred to an external control circuit via the circuit board 120 to output a press key command.

The first bracket 150, such as an outer frame, includes a shaft hole 155, a first base plate end 156, a first keycap end 157 and two first bracket lateral arms 158. The shaft hole 155 is located between the first keycap end 157 and the first base plate end 156. The first keycap end 157 is pivotally connected to the keycap 130. The first base plate end 156 is movably connected to the first the hook 112. The two first bracket lateral arms 158 are connected between the first keycap end 157 and the first base plate end 156. Besides, the second bracket 160, such as an inner frame, includes a convex shaft 163, a second base plate end 164, a second keycap end 165 and two second bracket lateral arms 166. The convex shaft 163 is located between the second keycap end 165 and the second base plate end 164 and can be arranged in the shaft hole 155. The second keycap end 165 is pivotally connected to the keycap 130. The second base plate end 164 is movably connected to the second the hook 113. The two second bracket lateral arms 166 are connected between the second keycap end 165 and the second base plate end 164.

Figure 2D:
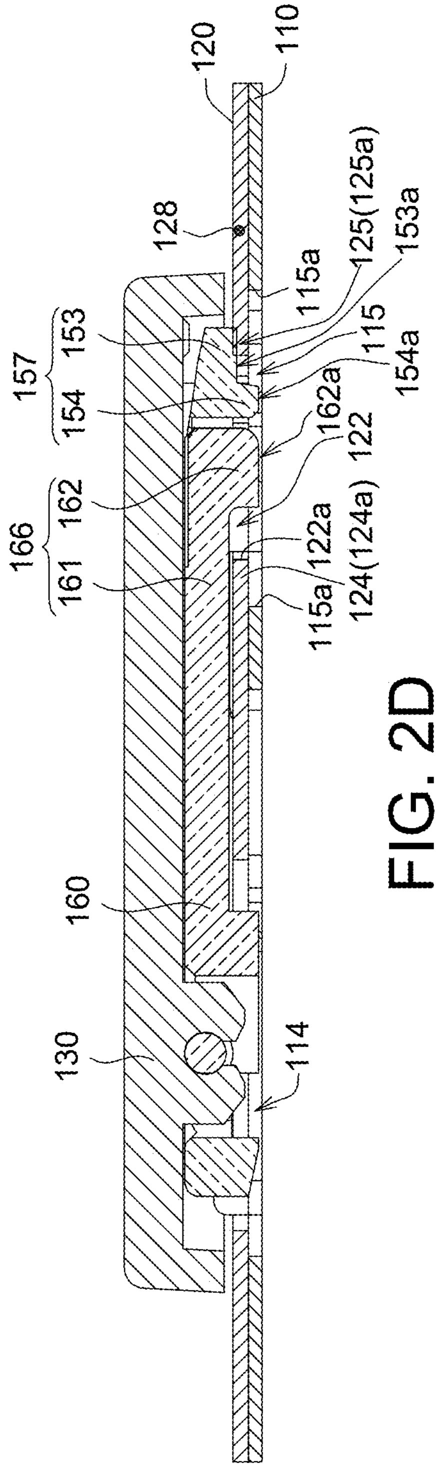

Refer to FIGS. 2A to 2D. FIGS. 2A and 2B respectively are cross-sectional views of the key structure of FIG. 1B along line 2A and line 2B in a pressed state according to an embodiment. FIGS. 2C and 2D respectively are cross-sectional views of the key structure of FIG. 1B along line 2C in an unpressed state and a pressed state according to an embodiment. In FIG. 2A, the cross section near the shaft shows that the first extension portion 123 extends parallel to the base plate 110 and overlaps with the first through hole 114 of the base plate 110. Each first bracket lateral arm 158 includes a first abutting portion 151 and a first lower protrusion 152. The first abutting portion 151 is located outside the first lower protrusion 152. The first abutting portion 151 and the first lower protrusion 152 are located on the bottom side of the first bracket lateral arm 158 and are arranged side by side and extend along the same direction. When the keycap 130 is pressed and lowered to a lowest position, the first abutting portion 151 at least partly overlaps with the first extension portion 123, and the first lower protrusion 152 at least partly enters the first through hole 114 of the circuit board 120. That is, the first extension portion 123 is located between the first lower protrusion 152 and the peritreme 114*a* of the first through hole 114.

Besides, the two second bracket lateral arms 166 include a second abutting portion 161 and a second lower protrusion 162. The second abutting portion 161 is located on the inner side of the second lower protrusion 162. The second abutting portion 161 and the second lower protrusion 162 are located on the bottom side of the second bracket lateral arm 166 and are arranged side by side and extend along the same direction. When the keycap 130 is pressed and lowered to the lowest position, the second abutting portion 161 at least partly overlaps with the first extension portion 123, and the second lower protrusion 162 at least partly enters the first through hole 114 of the circuit board 120. That is, the first extension portion 123 is located between the second lower protrusion 162 and the peritreme 114*a* of the first through hole 114.

As indicated in FIG. 2A, the circuit board 120 includes a wire 126; the edge of the first extension portion 123 includes at least one border area (that is, the first border area 123*a*); the first border area 123*a* is sealed with a sealant to prevent the infiltration of moisture. The peritreme 114*a* of the first through hole 114 of the base plate 110 is at least partly located between the first border area 123*a* and the wire 126. Since the first extension portion 123 extends towards the first through hole 114 and is not aligned with the peritreme 114*a* of the first through hole 114, the circuit board 120 can preserve a routing space for the wire 126 to increase the routing area. In an embodiment, the overlapping segment between the first border area 123*a* and the first through hole 114 exceeds a predetermined value, for instance, 50% of the area of the first border area 123*a*. That is, more than 50% of the segment by which the first border area 123*a* corresponds to the first through hole 114 of the base plate 110 overlaps with the first through hole 114; the width of the first border area 123*a* is about 0.5 mm or 5% of the edge length of the keycap 130. Also, since the first extension portion 123 extends towards the first through hole 114, the first border area 123*a* is correspondingly located under the first abutting portion 151. That is, the part by which the first extension portion 123 corresponds to the first through hole 114 at least partly overlaps with the first bracket 150, so that when the keycap 130 moves downwards to the lowest position, the first abutting portion 151 can interfere with the first border area 123*a*.

As indicated in FIG. 2A, when the keycap 130 reaches the lowest position, since the first lower protrusion 152 at least partly enters the first through hole 114 of the circuit board 120, the first extension portion 123 is located between the lower surface 151*a* of the first abutting portion 151 and the lower surface 152*a* of the first lower protrusion 152 in a direction perpendicular to the keycap 130. That is, when the keycap 130 reaches the lowest position, the first extension portion 123 is located between the lower surface 151*a* of the first abutting portion 151 and the upper surface 110*a* of the base plate 110.

In FIG. 2B, the cross section near the second the hook 113 shows that the second extension portion 124 extends parallel to the base plate 110 and overlaps with the second through hole 115 of the base plate 110. When the keycap 130 is pressed and lowered to the lowest position, the first abutting portion 151 at least partly overlaps with the second extension portion 124, and the first lower protrusion 152 at least partly enters the second through hole 115 of the circuit board 120. That is, the second extension portion 124 is located between the first lower protrusion 152 and the peritreme 115*a* of the second through hole 115.

As indicated in FIG. 2B, the circuit board 120 includes a wire 127; the edge of the second extension portion 124 includes at least one border area (that is, the second border area 124*a*); the second border area 124*a* is sealed with a sealant to prevent the infiltration of moisture. The peritreme 115*a* of the second through hole 115 of the base plate 110 is at least partly located between the second border area 124*a* and the wire 127. Since the second extension portion 124 extends towards the second through hole 115 and is not aligned with the peritreme 115*a* of the second through hole 115, the circuit board 120 can preserve a routing space for the wire 127 to increase the routing area. In an embodiment, the overlapping segment between the second border area 124*a* and the second through hole 115 exceeds a predetermined value, for instance, 50% of the area of the second border area 124*a*. That is, more than 50% of the segment by which the second border area 124*a* corresponds to the second through hole 115 of the base plate 110 overlaps with the second through hole 115. The width of the second border area 124*a* is about 0.5 mm or 5% of the edge length of the keycap 130. Also, since the second extension portion 124 extends towards the second through hole 115, the second border area 124*a* is correspondingly located under the first abutting portion 151. That is, the part by which the second extension portion 124 corresponds to the second through hole 115 at least partly overlaps with the second bracket 160, so that when the keycap 130 moves downwards to the lowest position, the first abutting portion 151 can interfere with the second border area 124*a*.

In FIG. 2B, when the keycap 130 reaches the lowest position, since the second lower protrusion 162 at least partly enters the second through hole 115 of the circuit board 120, the second extension portion 124 is located between the lower surface 151*a* of the first abutting portion 151 and the lower surface 152*a* of the first lower protrusion 152 in a direction perpendicular to the keycap 130. That is, when the keycap 130 reaches the lowest position, the second extension portion 124 is located between the lower surface 161*a* of the second abutting portion 161 and the upper surface 110*a* of the base plate 110.

In FIGS. 2C and 2D, the cross section near the first keycap end 157 shows that the third extension portion 125 extends parallel to the base plate 110 and overlaps with the second through hole 115 of the base plate 110. The first keycap end 157 includes a third abutting portion 153 and a third lower protrusion 154. The third abutting portion 153 is located outside the third lower protrusion 154; the third abutting portion 153 and the third lower protrusion 154 are located on the bottom side of upper end (the first keycap end 157); and the third abutting portion 153 and the third lower protrusion 154 are arranged side by side and extend along the same direction. When the keycap 130 is pressed and lowered to the lowest position, the third abutting portion 153 at least partly overlaps with the third extension portion 125, and the third lower protrusion 154 at least partly enters the second through hole 115 of the circuit board 120. Besides, the second abutting portion 161 at least partly overlaps with the other third extension portion 125, and the second lower protrusion 162 at least partly enters the second through hole 115 of the circuit board 120. That is, the third extension portion 125 is located between the third lower protrusion 154 and the peritreme 115*a* of the second through hole 115; the other third extension portion 125 is located between the second lower protrusion 162 and the peritreme 115*a* of the second through hole 115.

As indicated in FIGS. 2C and 2D, the circuit board 120 includes a wire 128; the edge of the third extension portion 125 includes at least one border area (that is, the third border area 125*a*); the third border area 125*a* is sealed with a sealant to prevent the infiltration of moisture. The peritreme 115*a* of the second through hole 115 of the base plate 110 is at least partly located between the third border area 125*a* and the wire 128. Since the third extension portion 125 extends towards the second through hole 115 and is not aligned with the peritreme 115*a* of the second through hole 115, the circuit board 120 can preserve a routing space for the wire 128 to increase the routing area. In an embodiment, the overlapping segment between the third border area 125*a* and the second through hole 115 exceeds a predetermined value, for instance, 50% of the area of the third border area 125*a*. That is, more than 50% of the segment by which the third border area 125*a* corresponds to the second through hole 115 of the base plate 110 overlaps with the second through hole 115. Also, since two third extension portions 125 extend towards the second through hole 115 from opposite sides, one of third border areas 125*a* is correspondingly located under the third abutting portion 153, and the other one of third border areas 125*a* is correspondingly located under the second abutting portion 161. That is, the part by which the two third extension portions 125 corresponds to the second through hole 115 at least partly overlaps with the first bracket 150 and/or the second bracket 160, so that when the keycap 130 moves downwards to the lowest position, the third abutting portion 153 and/or the second abutting portion 161 can interfere with the third border areas 125*a*.

As indicated in FIG. 2D, when the keycap 130 reaches the lowest position, since the third lower protrusion 154 at least partly enters the second through hole 115 of the circuit board 120, the third extension portion 125 is located between the lower surface 153*a* of the third abutting portion 153 and the lower surface 154*a* of the third lower protrusion 154 in a direction perpendicular to the keycap 130. That is, when the keycap 130 reaches the lowest position, the third extension portion 125 is located between the lower surface 153*a* of the third abutting portion 153 and the upper surface 110*a* of the base plate 110.

Refer to FIG. 1B. A top view from atop of the first bracket 150 shows that the first bracket 150 has a corner 150*a*, and the second extension portion 124 has a flange 124*b* overlapping with the corner 150*a*. Besides, the first bracket 150 has a shaft hole 150*b*, which corresponds to the shaft pivotal connection portion of the bottom of the keycap 130 (referring to FIG. 2C) and allows one end of the first bracket 150 (that is, the first keycap end 157) to be pivotally connected to the bottom of the keycap 130. A top view from atop of the first bracket 150 shows that the flange 124*b* of the second extension portion 124 overlaps with the shaft hole 150*b*.

In an embodiment, the first extension portion 123, the second extension portion 124 and the third extension portion 125 are respectively arranged along the Y axis; the first abutting portion 151, the second abutting portion 161 and the third abutting portion 153 are respectively arranged along the X axis; the first extension portion 123 is perpendicular to the first abutting portion 151; the second extension portion 124 is perpendicular to the first abutting portion 151; and the third extension portion 125 is perpendicular to the third abutting portion 153 and/or the second abutting portion 161. When the keycap 130 reaches the lowest position, the first extension portion 123 at least partly overlaps with the first abutting portion 151, the second extension portion 124 at least partly overlaps with the first abutting portion 151, and the third extension portion 125 at least partly overlaps with the third abutting portion 153 and/or the second abutting portion 161.

Figure 3:
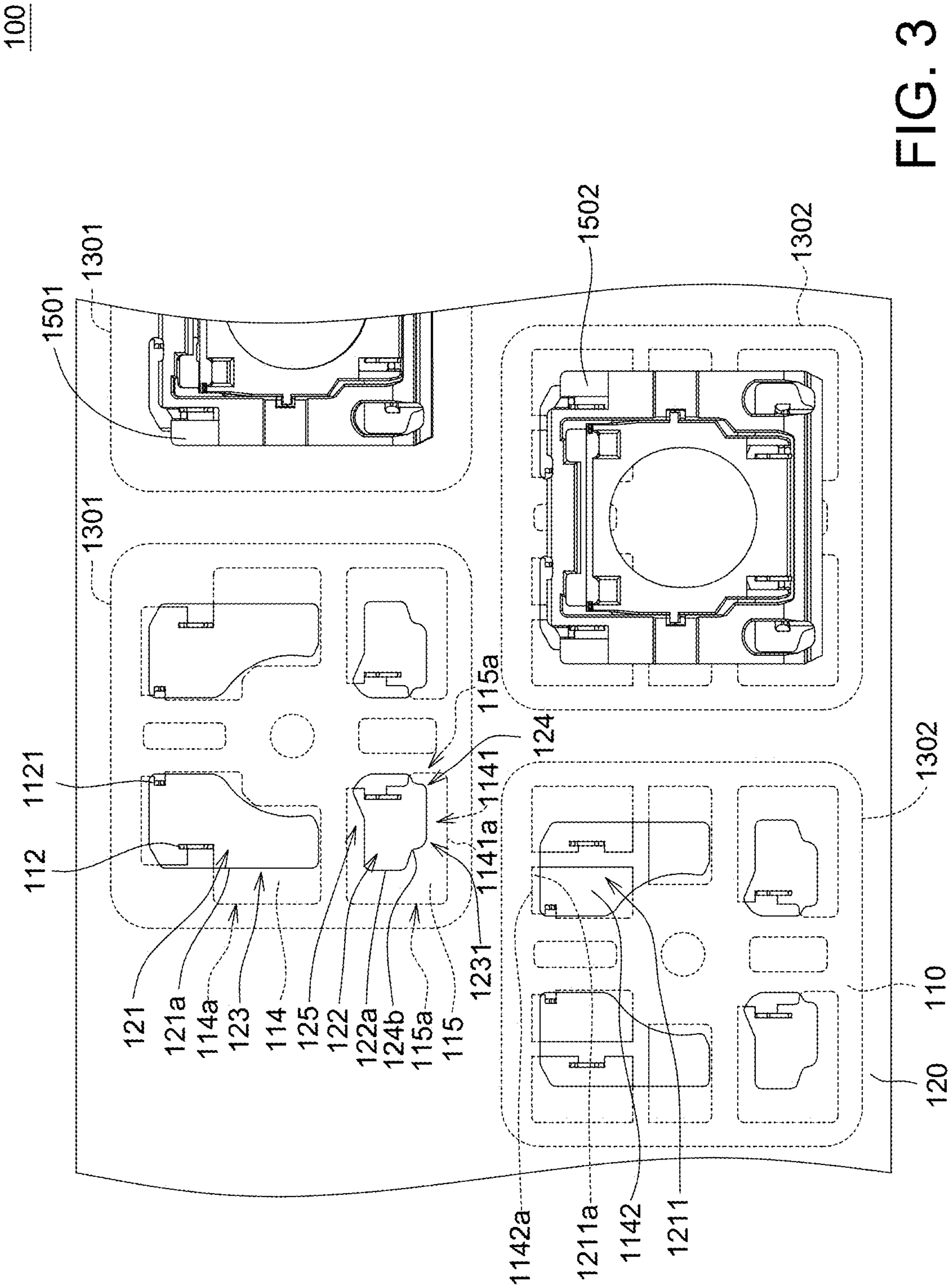
FIG. 3 is a schematic diagram of a key structure according to an embodiment of the present invention.

Referring to FIG. 3, a schematic diagram of a key structure according to the present invention an embodiment is shown. The key structure 100 includes a base plate 110, a circuit board 120, two adjacent keycaps (the base keycap 1301 and the neighbor keycap 1302 denoted by dotted lines) and at least two brackets (that is, the base support 1501 and the neighbor support 1502). The base plate 110 is arranged opposite to the two keycaps (the base keycap 1301 and the neighbor keycap 1302). The circuit board 120 is located between the two keycaps (the base keycap 1301 and the neighbor keycap 1302) and the base plate 110. Although the elastomers are not illustrated in the diagram, it can be obtained by way of inference that the two elastomers are respectively arranged between the circuit board 120 and the two keycaps (the base keycap 1301 and the neighbor keycap 1302) to support the two keycaps (the base keycap 1301 and the neighbor keycap 1302), so that the two keycaps 130 (the base keycap 1301 and the neighbor keycap 1302) can be raised to a higher position from a lower position. Besides, the two brackets (the base support 1501 and the neighbor support 1502) respectively are rotatably connected between the two keycaps (the base keycap 1301 and the neighbor keycap 1302) and the base plate 110 and allow the two keycaps (the base keycap 1301 and the neighbor keycap 1302) to descend and ascend in a vertical direction. The structure of the base support 1501 is basically identical to that of the neighbor support 1502, and each of the base support 1501 and the neighbor support 1502 includes a first bracket 150 and a second bracket 160 interconnected with each other. Detailed descriptions can be obtained with reference to the first bracket 150 and the second bracket 160 and are not repeated here.

The base plate 110 includes two adjacent through holes (the base hole 1141 and the neighbor hole 1142) respectively located under two adjacent keycaps (the base keycap 1301 and the neighbor keycap 1302). That is, the base hole 1141 is located under the base keycap 1301, and the neighbor hole 1142 is located under the neighbor keycap 1302.

The circuit board 120 is arranged on the base plate 110 and has an extension portion (that is, the base extension portion 1231) and an opening (that is, the neighbor opening 1211) respectively located under two adjacent keycaps (the base keycap 1301 and the neighbor keycap 1302). That is, the base extension portion 1231 is located under the base keycap 1301, and the neighbor opening 1211 is located under the neighbor keycap 1302. Additionally, the base extension portion 1231 overlaps with the base hole 1141 of the base plate 110, and the neighbor opening 1211 overlaps with the neighbor hole 1142.

A top view from atop of the base keycap 1301 and the neighbor keycap 1302 shows that the base support 1501 at least partly overlaps with the base extension portion 1231 of the circuit board 120 in a vertical direction; meanwhile, the neighbor support 1502 and the rim 1211*a* of the neighbor opening 1211 of the circuit board 120 at least partly do not interfere with each other in a vertical direction. That is, a top view from atop of the base keycap 1301 and the neighbor keycap 1302 shows that the first upper end of the base support 1501 (that is, the first keycap end 157) at least partly overlaps with the base extension portion 1231 of the circuit board 120 in a vertical direction. The first lower end of the neighbor support 1502 (that is, the first base plate end 156) and the rim 1211*a* of the neighbor opening 1211 of the circuit board 120 at least partly do not interfere with each other in a vertical direction. Since the base extension portion 1231 extends parallel to the base plate 110 and overlaps with the base hole 1141 and the neighbor opening 1211 overlaps with the neighbor hole 1142, the circuit board 120 has a larger routing space between the base keycap 1301 and the neighbor keycap 1302 or between the base support 1501 and the neighbor support 1502 and the routing area of the circuit board 120 is increased.

Refer to FIG. 3. The neighbor opening 1211 of the circuit board 120 has a rim 1211*a* adjacent to the base extension portion 1231. The neighbor hole 1142 corresponding to the neighbor opening 1211 has a peritreme 1142*a* almost aligned with the rim 1211*a* of the neighbor opening 1211. Thus, the routing space of the circuit board 120 which was the space from the rim 1211*a* of the neighbor opening 1211 to the peritreme 1141*a* of the base hole 1141 now changes to the space from the rim 1211*a* of the neighbor opening 1211 to the base extension portion 1231, and the created area can be used as a routing area or a border area.

Figure 4:
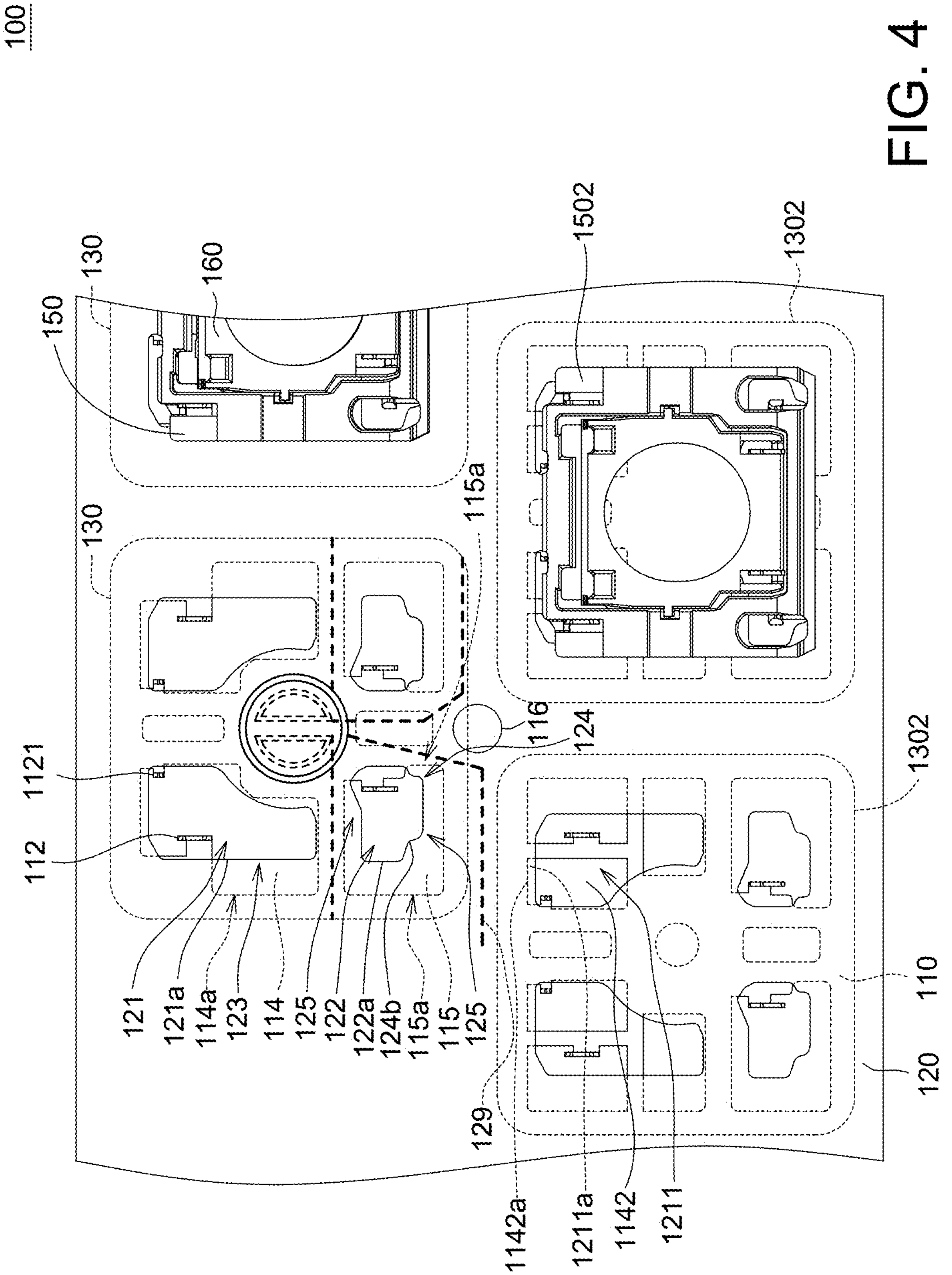
FIG. 4 is a schematic diagram of a key structure according to an embodiment of the present invention.

Referring to FIG. 4, a schematic diagram of a key structure according to the present invention an embodiment is shown. The key structure 100 includes a base plate 110, a circuit board 120, a keycap 130 (denoted by dotted lines) and at least one bracket (that is, the first bracket 150 and/or the second bracket 160). The base plate 110 is arranged opposite to the keycap 130; the circuit board 120 is located between the keycap 130 and the base plate 110. Although the elastomers 140 are not illustrated in the diagram, it can be obtained by inference that the elastomer 140 is arranged between the circuit board 120 and the keycap 130 and allows the keycap 130 to be raised from a lower position to a higher position. The first bracket 150 and the second bracket 160 are rotatably connected between the keycap 130 and the base plate 110, keep flat when the keycap 130 is lowered to a lowest position and stand obliquely when the keycap 130 is raised. The first bracket 150 and the second bracket 160 include at least one abutting portion (that is, the first abutting portion 151, the second abutting portion 161 and/or the third abutting portion 153) and a lower protrusion (that is, the first lower protrusion 152, the second lower protrusion 162 and/or the third lower protrusion 154).

The base plate 110 includes at least one through hole (that is, the first through hole 114 and/or the second through hole 115) located under the keycap 130. Besides, the base plate 110 further includes a via hole 116 located outside the first through hole 114 and/or the second through hole 115. That is, the via hole 116 at least partly overlaps with the keycap 130; the via hole 116 at least partly exceeds the keycap 130.

Additionally, the circuit board 120 is located between the keycap 130 and the base plate 110; the circuit board 120 has at least one opening (that is, the first opening 121 and/or the second opening 122) and at least one extension portion (that is, the first extension portion 123, the second extension portion 124 and/or the third extension portion 125). The at least one extension portion (that is, the first extension portion 123, the second extension portion 124 and/or the third extension portion 125) is located on one side of the opening (that is, the first opening 121 and/or the second opening 122) and overlaps with at least one through hole of the base plate 110 (that is, the first through hole 114 and/or the second through hole 115). That is, the first extension portion 123 is located on one side of the first opening 121 and overlaps with the first through hole 114 of the base plate 110; the second extension portion 124 is located on one side of the second opening 122 and overlaps with the second through hole 115 of the base plate 110; the third extension portion 125 is located on the other side of the second opening 122 and overlaps with the second through hole 115 of the base plate 110.

In an embodiment, the extension portion of the circuit board 120 is disposed to allow the peritreme of the through hole to be located between the extension portion and the via hole 116. That is, in the circuit board 120, the peritreme 114*a* of the first through hole 114 is located between the first extension portion 123 and the via hole 116; the peritreme 115*a* of the second through hole 115 is located between the second extension portion 124 and the via hole 116; the peritreme 115*a* of the second through hole 115 is located between the third extension portion 125 and the via hole 116.

Refer to FIG. 4. The circuit board 120 further includes a wire 129 located between any extension portion disclosed above and the via hole 116. That is, the wire 129 can pass through two adjacent press keys (that is, the base press key and the neighbor press key) to be connected to the triggering portion 1201 of the circuit board 120. Thus, the first to the third extension portions 123, 124 and 125 can increase the routing space of the circuit board 120.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A key structure, comprising:

a keycap;

a base plate arranged opposite to the keycap, wherein the base plate comprises at least one through hole located under the keycap;

at least one bracket rotatably connected between the keycap and the base plate, wherein the bracket keeps flat when the keycap is lowered to a lowest position, stands obliquely when the keycap is raised, and has at least one abutting portion and a lower protrusion;

a circuit board located between the keycap and the base plate, wherein the circuit board has at least one opening and at least one extension portion, the at least one extension portion extends parallel to the base plate and overlaps with the at least one through hole of the base plate;

wherein when the keycap reaches the lowest position, the at least one extension portion at least partly overlaps with the abutting portion, and the lower protrusion at least partly enters the at least one opening.

2. The key structure according to claim 1, wherein the at least one extension portion is located between the lower protrusion and a peritreme of the at least one through hole.

3. The key structure according to claim 1, wherein the circuit board has a wire, an edge of the at least one extension portion has a border area, and a peritreme of the at least one through hole is at least partly located between the border area and the wire.

4. The key structure according to claim 1, wherein an edge of the at least one extension portion has at least one border area, and more than 50% of a segment by which the at least one border area corresponds to the at least one through hole overlaps with the through hole.

5. The key structure according to claim 1, wherein an edge of the at least one extension portion has a border area, and a part by which the border area corresponds to the at least one through hole at least partly overlaps with the at least one bracket.

6. The key structure according to claim 1, wherein when the keycap reaches the lowest position, the at least one extension portion is located between a lower surface of the abutting portion and a lower surface of the lower protrusion.

7. The key structure according to claim 1, wherein when the keycap reaches the lowest position, the at least one extension portion is located between a lower surface of the abutting portion and an upper surface of the base plate.

8. The key structure according to claim 1, wherein the abutting portion and the lower protrusion are located on a bottom side of a lateral arm of the bracket or a bottom side of an upper end of the bracket.

9. The key structure according to claim 1, wherein the abutting portion and the lower protrusion are arranged side by side and extend along a same direction.

10. The key structure according to claim 1, wherein the bracket has a corner, and the at least one extension portion has a flange overlapping with the corner.

11. The key structure according to claim 1, wherein the bracket has a shaft hole located at a corner of the bracket, and the at least one extension portion has a flange overlapping with the shaft hole.

12. The key structure according to claim 1, wherein the at least one extension portion is perpendicular to the abutting portion.

13. The key structure according to claim 1, wherein the base plate further comprises a via hole located outside the at least one through hole, a peritreme of the at least one through hole is located between the at least one extension portion and the via hole.

14. The key structure according to claim 1, wherein the base plate further has a via hole located outside the at least one through hole, and the circuit board further has a wire located between the at least one extension portion and the via hole.

15. The key structure according to claim 1, wherein the base plate further has a via hole located outside the at least one through hole, the via hole penetrates the circuit board and the base plate and at least partly exceeds the keycap.

16. A key structure, comprising:

two adjacent keycaps;

a base plate arranged opposite to the two keycaps, wherein the base plate at least has two adjacent through holes respectively located under the two adjacent keycaps;

at least two brackets respectively rotatably connected between the two keycaps and the base plate, wherein the at least two brackets respectively allow the two keycaps to ascend and descend in a vertical direction;

a circuit board located between the two keycaps and the base plate, wherein the circuit board has an extension portion and an opening respectively located under the two adjacent keycaps, the extension portion overlaps with one of the two through holes, and the opening overlaps with another one of the two through holes;

wherein one of the at least two brackets at least partly overlaps with the extension portion in the vertical direction; meanwhile, the other one of the at least two brackets and a rim of the opening at least do not interfere with each other in the vertical direction.

17. The key structure according to claim 16, wherein, the opening has a rim adjacent to the extension portion, the through hole corresponding to the opening has a peritreme, and the rim of the opening is almost aligned with the peritreme of the through hole.

18. The key structure according to claim 16, wherein, a first upper end of the bracket at least partly overlaps with the extension portion in a vertical direction.

19. The key structure according to claim 16, wherein a first lower end of the bracket and a rim of the opening at least partly do not interfere with each other in a vertical direction.

20. A key structure, comprising:

a keycap;

a base plate arranged opposite to the keycap, wherein the base plate has at least one through hole located under the keycap, and the base plate further has a via hole located outside the at least one through hole;

at least one bracket rotatably connected between the keycap and the base plate, wherein the bracket keeps flat when the keycap is lowered to a lowest position, stands obliquely when the keycap is raised, and comprises at least one abutting portion and a lower protrusion;

a circuit board located between the keycap and the base plate, wherein the circuit board has at least one opening and at least one extension portion; wherein the at least one extension portion is located on one side of the opening and overlaps with the at least one through hole;

wherein the at least one extension portion is disposed to allow a peritreme of the at least one through hole to be located between the at least one extension portion and the via hole.

* * * * *